United States Patent [19]

Chambert

[11] Patent Number: 5,499,387
[45] Date of Patent: Mar. 12, 1996

[54] HANDOFF METHOD WHEREIN STORED MEASURED INFORMATION IS TRANSFERRED BETWEEN BASE STATIONS

[75] Inventor: William R. G. Chambert, Uppsala, Sweden

[73] Assignee: Telefonaktiebolaget LM Ericsson, Stockholm, Sweden

[21] Appl. No.: 247,457

[22] Filed: May 23, 1994

Related U.S. Application Data

[63] Continuation of Ser. No. 711,892, Jun. 7, 1991, abandoned.

[30] Foreign Application Priority Data

Jul. 6, 1990 [JP] Japan ........................ 1-2377

[51] Int. Cl.⁶ ..................................................... H04Q 7/30
[52] U.S. Cl. .......................... 455/33.2; 455/54.1; 379/60
[58] Field of Search ............................ 455/33.2, 54.1, 455/54.2, 56.1; 379/60

[56] References Cited

U.S. PATENT DOCUMENTS

| | | | |
|---|---|---|---|
| 4,654,879 | 3/1987 | Goldman et al. | 455/33 |
| 4,765,753 | 8/1988 | Schmidt | 379/60 |
| 4,775,999 | 10/1988 | Williams | 455/33.2 |
| 4,887,265 | 12/1989 | Felix | 455/54.2 |
| 5,101,501 | 3/1992 | Gilhousen et al. | 455/33.2 |
| 5,127,100 | 6/1992 | D'Amico et al. | 455/56.1 |
| 5,189,734 | 2/1993 | Bailey et al. | 455/33.2 |
| 5,239,682 | 8/1993 | Strawcynski et al. | 455/62 |

FOREIGN PATENT DOCUMENTS 0332818  9/1989  European Pat. Off. .

*Primary Examiner*—Edward F. Urban
*Attorney, Agent, or Firm*—Burns, Doane, Swecker & Mathis

[57] ABSTRACT

The invention relates to a method in connection with handoff in a mobile radio communication system comprising at least one mobile station and a set of base stations surrounding the mobile station, each of the base stations including at least one traffic channel. Measured information that is significant for handoff-decisions and that before handoff of the mobile station from a first traffic channel to a second traffic channel has been measured, stored and associated with the first traffic channel, is associated with the second traffic channel in connection with handoff.

8 Claims, 3 Drawing Sheets

HANDOFF METHOD WHEREIN STORED MEASURED INFORMATION IS TRANSFERRED BETWEEN BASE STATIONS

This application is a continuation of application Ser. No. 07/771,892, filed Jun. 7, 1991, now abandoned.

TECHNICAL FIELD

The invention relates to a method in connection with handoff in a mobile radio communication system, for instance a cellular mobile telephone system, comprising at least one mobile station and a set of base stations surrounding said mobile station, each of said base stations containing at least one traffic channel. With the method in accordance with the present invention the conditions for handoff are improved, and thereby the probability of calls interrupted by handoff is reduced.

DESCRIPTION OF THE PRIOR ART

In existing analog mobile radio communication systems the signal strength of the mobile station is measured at surrounding base stations only when the necessity for handoff has been determined and signalled from the mobile station. Several measurements have to be performed and the average of these has to be formed, whereafter it is decided to which base station the handoff is to be performed.

In digital mobile radio communication systems measurements can be performed with so called mobile assisted handoff, MAHO, where the mobile station continuously measures the signal strength from its own and surrounding base stations and forms average values thereof. The measurement results are then reported to its "own" base station, that is to that base station with which the mobile station currently communicates. Reported measurement results are used after further processing, for instance weighted averageing, as basis for for handoff decisions.

Since in both systems a certain amount of time is required to report measurement values before an average value can be formed, the problem arises that a second handoff has to be forbidden during the time it takes to receive the number of new measurements that are required to make a reliable new handoff decision.

SUMMARY OF THE INVENTION

An object of the present invention is to make possible a second handoff immediately after a first handoff, that is without requiring that a certain amount of time has to elapse before the second handoff decision can be made.

The invention is based on the observation that the mobile station does not significantly change its geographical position from a moment immediately before a handoff decision to a moment immediately after the handoff decision. This implies that the measurements that have already performed before the moment of handoff are also relevant after the handoff to the new base station. Thus, this information could therefore be used during the time it takes the new base station to build up sufficient information of its own for handoff decisions.

Therefore, an essential feature of the invention is that measured information that is significant for handoff decisions and that before handoff of said mobile station from a first traffic channel to a second traffic channel has been measured, stored and associated with said first traffic channel, in connection with handoff is associated with said second traffic channel.

SHORT DESCRIPTION OF THE DRAWINGS

The invention, further objects and advantages obtained by the invention are best understood by reference to the following description and the accompanying drawings, in which.

DESCRIPTION OF PREFERRED EMBODIMENT

A preferred embodiment of the invention will now be described with reference to a cellular mobile telephone system that uses mobile assisted handoff, MAHO. However, it is appreciated that the method in accordance with the invention is not restricted to such a system, but can be used also in other mobile radio communication systems, both analog and digital.

Figure 1:
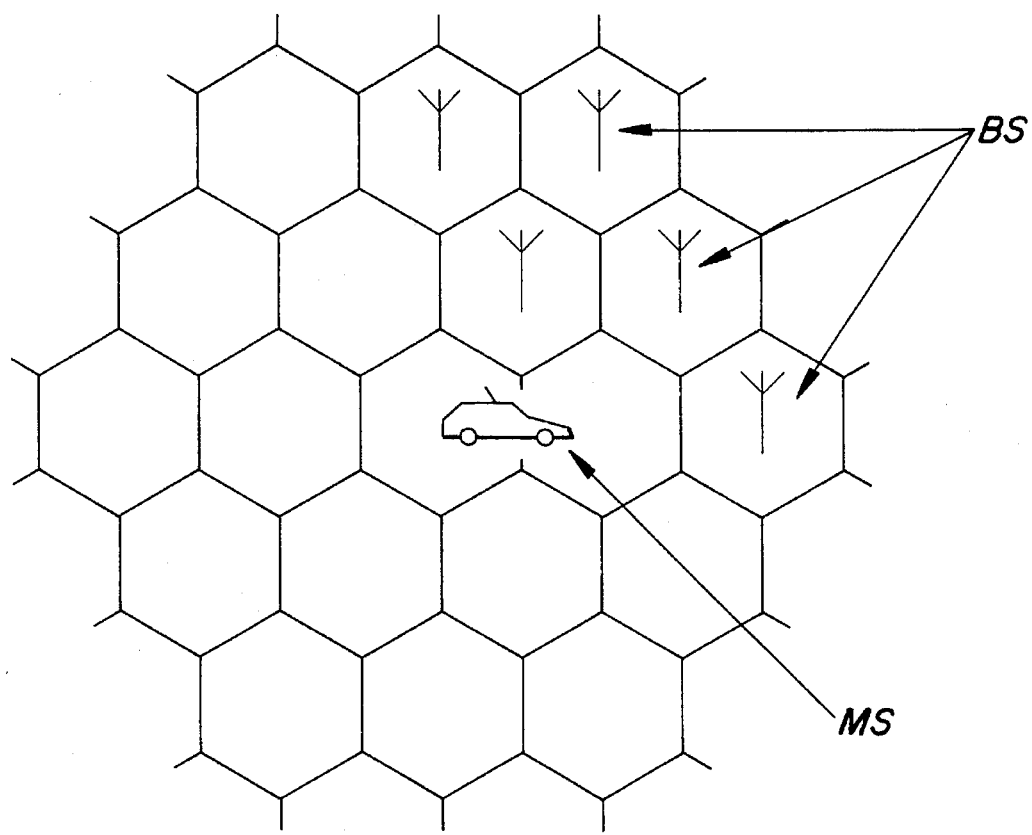
FIG. 1 shows a cellular mobile telephone system.

FIG. 1 shows the structure of an embodiment of a cellular mobile telephone system. Such a system comprises a number of cells, each cell in this embodiment comprising one base station BS. For reasons of simplicity only a number of such base stations BS are shown in the Figure. The base stations BS are in radio communication with a number of mobile stations MS, of which only one is shown in the Figure. Mobile station MS generally communicates with the base station BS in the cell in which it presently is located. As mobile station MS moves from cell to cell the communication is handed over from the base station BS in one cell to the base station BS in a neighbouring cell. This procedure is called handoff. During handoff the old base station instructs mobile station MS to change to another traffic channel belonging to the new base station.

Figure 2:
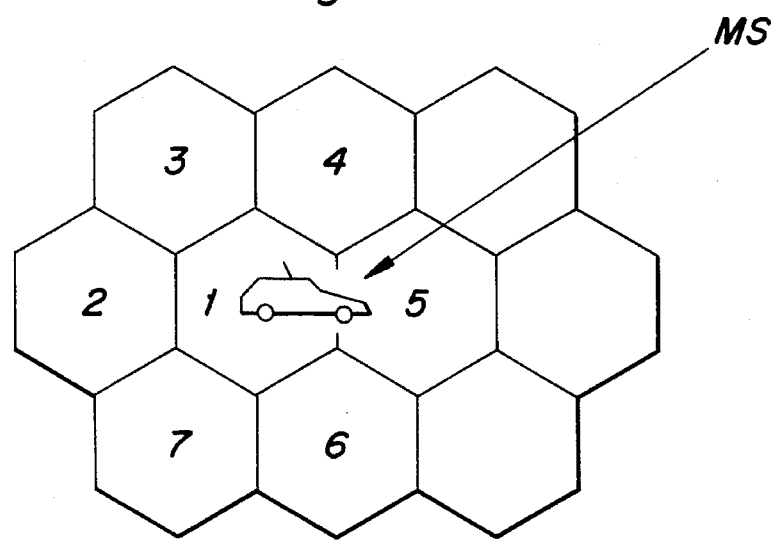
FIG. 2 shows a part of the mobile telephone system of FIG. 1 in connection with handoff.

FIG. 2 shows a part of the mobile telephone system in FIG. 1. In FIG. 2 the cells 1–7 have been explicitly marked. For reasons of simplicity the corresponding base stations BS1–BS7 have not been drawn. However, in this specification it is understood that for instance cell number 3 corresponds to base station BS3.

In FIG. 2 a mobile station MS, that communicates with base station BS1, is on its way to cell 5 to communicate with base station BS5 after handoff.

In mobile assisted handoff, MAHO, mobile station MS measures the signal strength SS on the control channel CC of the mobile telephone system for base stations BS2–BS7 surrounding cell 1. This parameter is therefore designated SS(CC) in this specification. In the same way the mobile station measures the signal strength SS of its "own" base station BS1, but in this case the measurements are on the traffic or voice channel TC. This parameter is designated SS(TC). Furthermore, mobile station MS also measures the signal quality of its own base station BS1. This is done by measuring the bit error rate, BER, on the traffic channel TC of its own base station. This parameter is designated BER(TC).

Since the measurement values often fluctuate it is not appropriate to base a handoff decision on only the latest measured values. In for instance the GSM system the average of a suitable number of measured values is therefore formed during approximately 0.5 seconds. Therefore mobile station MS is provided with logic that continiously stores for instance the latest 5–10 measured values, forms the average of these values and reports this average to base station BS1. Thereafter for instance the latest 25 reported averages during approximately 12.5 seconds are used for weighted averaging in the base station for forming a basis for handoff decisions. However, this procedure implies that a certain amount of time is required, namely the time it takes for base station BS5 to collect the necessary number of reported measurement values required for the weighted averaging, 12.5 seconds in the example, before base station BS5 after handoff has formed a new basis for a possible new handoff decision. This is because in previously known mobile telephone systems all previous information is lost in the moment of handoff. It is exactly this drawback that is eliminated with the method in accordance with the present invention.

A preferred embodiment of the invention will now be described with reference to FIGS. 3–7.

Figure 3:
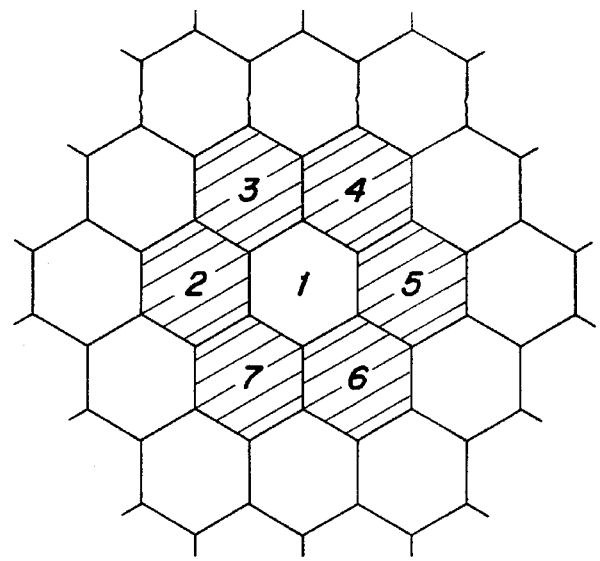
FIG. 3 shows a first phase in connection with the transfer of measured information in accordance with the invention.
Figure 4:
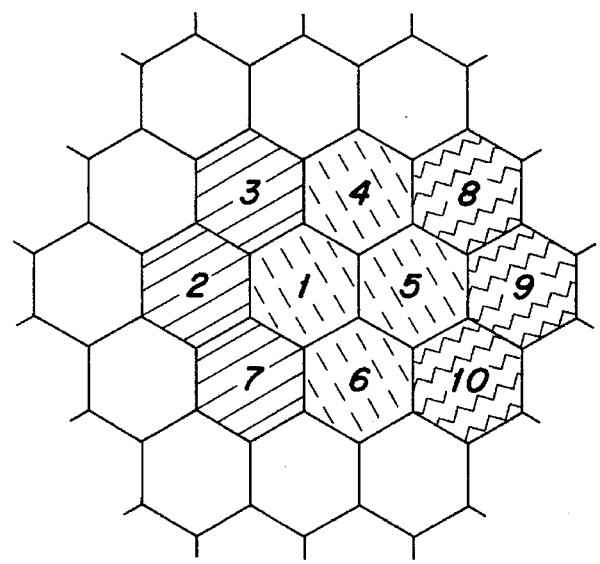
FIG. 4 shows a second phase in connection with transfer of measured information in accordance with the present invention.
Figure 5:
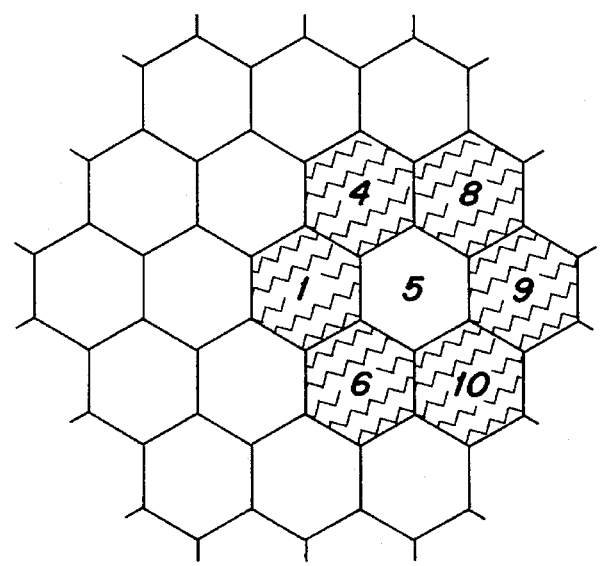
FIG. 5 shows a third phase in connection with transfer of measured information in accordance with the present invention.

FIGS. 3–5 show a handoff sequence corresponding to the situation of FIG. 2, but in this case the method according to the invention is used.

FIG. 3 illustrates the situation immediately before handoff. Mobile station MS measures the parameters mentioned above for the base stations in cells 1–7, i.e. SS(CC) for the hatched cells 2–7 and SS(TC) and BER(TC) for its own cell 1.

In FIG. 4 handoff has just been performed to base station BS5 in cell 5. Simultaneously with handoff the measured information that was stored in base station BS1 for the cells 1, 4, 5 and 6 closest to the mobile has been transferred from base station BS1 to base station BS5. These cells have been marked with dashed lines. Information that has been measured before handoff for cells 2, 3 and 7 is, however, not transferred between the old and new base station. If a new handoff has to be performed immediately after the first handoff it is not probable in this situation that one of these stations is a candidate for taking over the radio communication with the mobile station, since the mobile station is travelling away from these stations.

For cells 8, 9 and 10, which are marked by zig-zag lines, there is no previously measured information available, and therefore the measurement procedure for these cells is started in the same way as in the prior art. Since, no reliable measurement information is available for these cells it is desireable to initially avoid handoff to any of these cells, e.g. during the three first seconds after the first handoff. This can e.g. be done by having a time monitoring system preventing handoff to these neighbouring cells during a certain time period or by setting the limit for acceptable signal strength for handoff higher to these cells during such time period.

After a while, e.g. after 12.5 seconds as above, mobile station MS has updated measured information for all the surrounding cells that are on the current measuring list for the mobile station, namely cells 5, 1, 4, 8, 9, 10 and 6. This situation is shown in FIG. 5. The system then is in the same measuring phase as in FIG. 3, the difference being that the "own" base station now is base station BS5.

From the above it is apparent that the invention during the critical phase, represented by FIG. 4, allows the use of measured information for cells 1, 4, 5 and 6 from immediately before handoff to base station BS5. If a new handoff is required immediately after this first handoff, this information is valuable, since exactly the base stations in cells 1, 4 and 6 are the most probable candidates for a new handoff in this situation. The probability that an acurate handoff decision is made is therefore increased significantly if measured information follows from base station to base station in the described manner.

Figure 6:
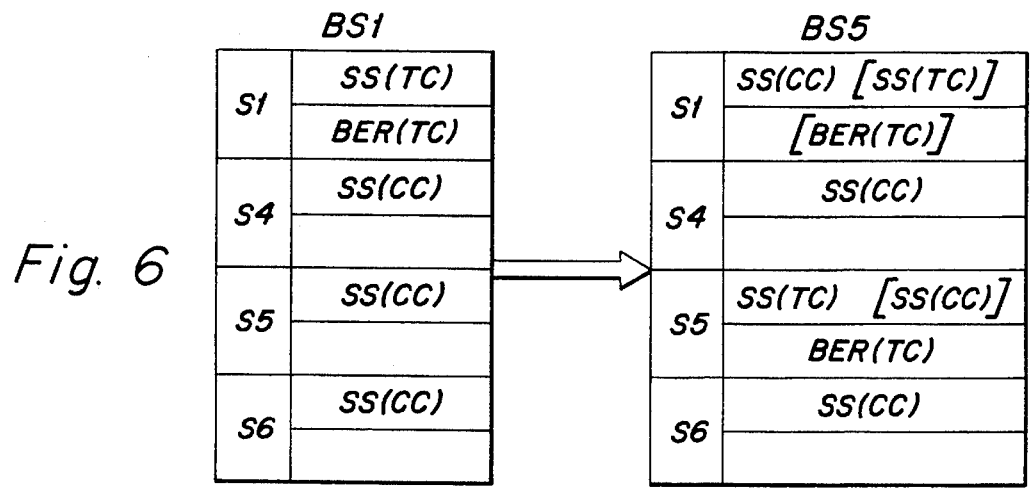
FIG. 6 shows an example of a data structure for transferring measured information in accordance with the present invention.

FIG. 6 shows an example of a data structure that can be used for the information transfer.

The microcomputer of base station BS1 contains a memory area in which the measured information to be transferred is stored. This memory area is divided into four segments S1, S4, S5 and S6, i.e. one segment for each cell whose measured information is to be transferred. At the moment immediately before handoff the parameters SS(TC) and BER(TC) are stored in memory segment S1. Memory segments S4, S5 and S6 store only the parameter SS(CC). However, also segments S4, S5 and S6 contain storage areas for the parameter BER, but these storage areas are unused in the described situation. With conditions corresponding to the example above e.g. the latest 25 reported measured values are stored for each parameter.

In connection with handoff to base station BS5 the information measured before handoff is transferred to a corresponding memory area in the micro computer of base station BS5. Thus, memory segment S1 in base station BS5 will immediately after handoff contain values SS(TC) and BER(TC) measured immediately before handoff. These parameters have been marked with brackets to indicate that they originate from a point in time before handoff. In the same way memory segment S5 of base station BS5 will contain values [SS(CC)] measured before handoff. When mobile station MS starts to report new measured values to the new base station BS5, the measures values within brackets will successively be replaced with newly measured values. In memory segment S1 measured values [SS(TC)] will therefore soon be replaced by new measured values SS(CC). In the same way SS(TC) will soon replace [SS(CC)] in memory segment S5. As regards the old values [BER(TC)] in memory segment S1, these will no longer be of interest after this period and can therefore be set to e.g. zero or any other predetermined value that indicates that the information is not relevant. Since base station BS5 now is the mobile stations "own" base station the data area BER(TC) of memory segment S5 will also be filled with values.

As regards the transfer of information between memory segments S5 and S6 of base stations BS1 and BS5, the information SS(CC) is transferred in connection with handoff, and after handoff mobile station MS continuous to measure the same parameters for the corresponding cells 4 and 6. The transferred measured information in segments S4 and S6 will therefore be updated with new measured results for the same parameters.

In FIG. 6 only the segments that are relevant during handoff between base stations BS1 and BS5 have been included. However, since it is not possible in advance to know in which direction mobile station MS will leave cell 1, it is appreciated that base station BS1 also must contain corresponding memory segments for cells 2, 3 and 7. In the same way it is appreciated that base station BS5 contains memory segments for the newly added cells 8, 9 and 10. In other words, each base station for each traffic channel contains memory segments for its own cell and for all the cells adjacent thereto.

From the above description it is appreciated that the blocked period after handoff in previously known systems has been eliminated by combining reported values measured immediately after handoff with transferred old measured values, whereby the weighted averaging process can directly be started for forming a basis for a new handoff decision.

In the above specification it has been assumed that the same number of measured values that is used for the weighted averaging in the base station, 25 in the example, are also transferred in connection with handoff. However, this is not absolutely necessary and sometimes not even desirable, since this method would require transfer and storage of large amounts of data. An alternative is to transfer only e.g. the 5–10 latest measured values. In such a case, however, the algorithm for the weighted averaging has to consider this fact after a handoff, since initially there are not enough measured values for the ordinary algorithm. In this transient phase the algorithm can e.g. look up new weighting factors after each newly reported measured value until a total of 25 measured values are available, whereafter the algorithm can proceed to a stationary phase with 25 constant weighting weighting factors.

Figure 7:
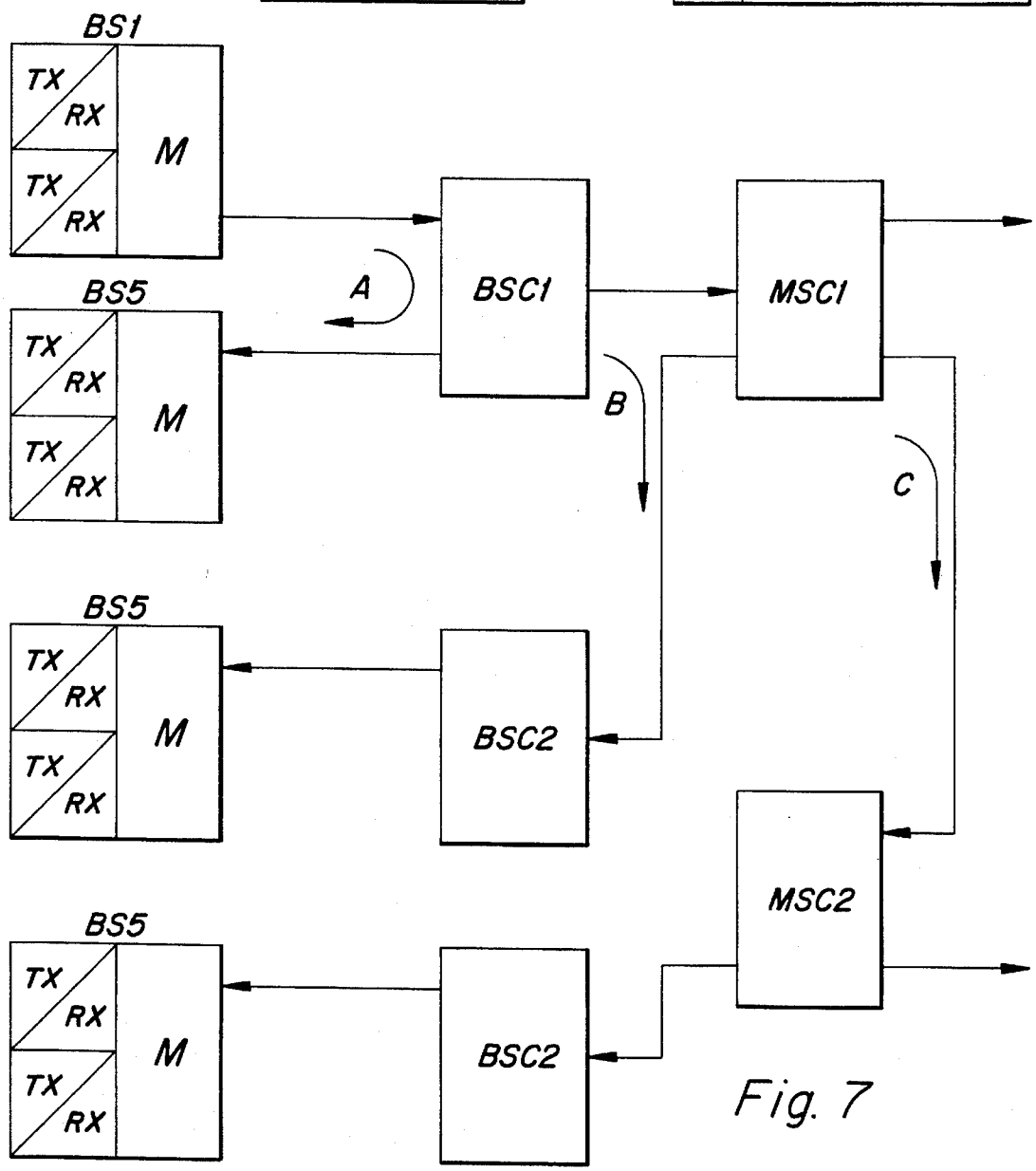
FIG. 7 shows an example of the structure of a mobile telephone system for performing the method in accordance with the present invention.

FIG. 7 shows an example of the structure of a mobile telephone system for performing the method in accordance with the present invention in three different cases A, B and C.

In case A the old base station BS1 and the new base station BS5 are connected to the same base station controller BSC1. The data transfer from memory area M of base station BS1 to memory area M of base station BS5 can therefore be performed over base station controller BSC1, as indicated by arrow A.

In case B base station BS5 is not connected to the same base station controller BSC1 as base station BS1, but to another base station controller BSC2. However, both BSC1 and BSC2 are connected to the same mobile services switching centre MSC1. The data transfer in connection with handoff can therefore be performed over BSC1, MSC1 and BSC2, as indicated by arrow B in FIG. 7.

In case C base station BS5 over its controller BSC3 is connected to another mobile services switching centre MSC2. In this case mobile services switching centres MSC1 och MSC2 are connected to each other, so that measured information can be transferred over BSC1, MSC1, MSC2 and BSC3, as indicated by arrow C in FIG. 7.

Another case of handoff is possible, namely handoff between two traffic channels associated with the same base station BS1. In this case the measured information does not have to be transferred from base station BS1, but only within the station, which case is further described below.

In the above example it is apparent that measured information in all cases after handoff is associated with the new traffic channel.

The following measured information considered to be significant for handoff decisions and intended to be transferred between base stations in connection with handoff has been mentioned:

the signal strength SS measured on the control channel of another cell, the signal strenght SS and bit error rate BER on the own traffic channel.

Other significant measured information in connection with handoff includes:

the time dispersion TD, channel quality C/I (Carrier/Interference) on the own traffic channel.

It can also be appropriate to measure these parameters in the mobile station and transfer them from base station to base station in connection with handoff.

In the embodiment of FIGS. 6 and 7 the measures information is stored in each base station. However, this is only one possibility. It is also possible to instead store the measured information for several base stations in e.g. a base station controller or even in a mobile services switching centre. Also in these cases the same principles can be used, namely that the measured information after handoff is associated with the new traffic channel of the mobile station.

The above description has for reasons of simplicity concentrated on the case where handoff is performed between traffic channels belonging to different base stations. However, since each base station normally includes several traffic channels with different frequences it is in certain cases, as mentioned above, possible to perform handoff between two traffic channels belonging to the same base station. In such a case it is not necessary that measured information is moved from this base station. Instead the information can be moved between memory segments within the memory area of the base station, which in addition to the previously mentioned set of memory segments also includes corresponding sets of memory segments for each additional traffic channel. Instead of physically moving measured information pointers can be used to point to relevant memory segments, in which case these pointers are updated in connection with handoff. However, it is appreciated that the inventive idea, namely to associate previously measured information with the new traffic channel, is applicable also in this case.

The man skilled in the art appreciates that different changes and modifications of the invention are possible without departure from the scope of the invention, which is defined in the attached patent claims.

I claim:

1. A handoff method in a mobile radio communication system comprising at least one mobile station and a set of base stations surrounding said mobile station, each of said base stations comprising at least one traffic channel, said method comprising the steps of:

repeatedly measuring at least one channel quality parameter of a first traffic channel associated with one of said base stations;

storing a plurality of recently measured values of said at least one channel quality parameter;

determining whether a handoff is necessary using said associated plurality of recently measured values;

ordering handoff from said first traffic channel to a second traffic channel;

assigning said stored plurality of recently measured values to said second traffic channel for use in determining future handoffs; and gradually replacing values in said plurality by values of said at least one channel quality parameter measured after handoff to said second traffic channel.

2. The method according to claim 1, wherein said first traffic channel belongs to a first base station and said second traffic channel belongs to a second base station in said set, and said measured information is transferred from said first to said second base station.

3. The method according to claim 2, wherein said measured information includes the signal strength and bit error rate of said first traffic channel for signals transmitted from said first base station and the signal strength on the control channel of said mobile radio communication system for signals transmitted from the remaining base stations in said set.

4. The method according to claim 3, wherein said measured information includes the time dispersion on said first traffic channel for signals transmitted from said first base station.

5. The method according to claim 4, wherein said measured information includes the channel quality on said first traffic channel for signals transmitted from said first base station.

6. The method according to claim 2, wherein said measured information includes the time dispersion on said first traffic channel for signals transmitted from said first base station.

7. The method according to claim 3, wherein said measured information includes the channel quality on said first traffic channel for signals transmitted from said first base station.

8. The method according to claim 6, wherein said measured information includes the channel quality on said first traffic channel for signals transmitted from said first base station.

* * * * *